(12) United States Patent
Heuschmid et al.

(10) Patent No.: US 7,478,828 B2
(45) Date of Patent: Jan. 20, 2009

(54) SAFETY ARRANGEMENT FOR MOTOR VEHICLES

(75) Inventors: Rainer Heuschmid, Ulm (DE); Udo Untch, Ulm (DE); Werner Geiselhart, Ulm (DE)

(73) Assignee: Takata-Petri (ULM) GmbH, Ulm (DE)

( * ) Notice: Subject to any disclaimer, the term of this patent is extended or adjusted under 35 U.S.C. 154(b) by 338 days.

(21) Appl. No.: 11/098,616

(22) Filed: Apr. 5, 2005

(65) Prior Publication Data

US 2005/0230173 A1 Oct. 20, 2005

(30) Foreign Application Priority Data

Apr. 5, 2004 (DE) .................. 10 2004 017 650

(51) Int. Cl.
*B60R 21/16* (2006.01)
(52) U.S. Cl. .................. 280/730.1; 280/730.2; 180/274; 296/68.1; 297/216.1
(58) Field of Classification Search .................. 180/271, 180/274; 296/68.1; 297/216.1, 216.12, 216.13, 297/216.14; 280/730.2, 730.1
See application file for complete search history.

(56) References Cited

U.S. PATENT DOCUMENTS

| | | | | |
|---|---|---|---|---|
| 3,779,577 A | * | 12/1973 | Wilfert ..................... | 280/730.1 |
| 4,946,191 A | * | 8/1990 | Putsch ..................... | 280/730.2 |
| 5,788,271 A | * | 8/1998 | Sotelo ..................... | 280/730.1 |
| 5,833,312 A | * | 11/1998 | Lenz ..................... | 297/216.13 |
| 6,572,137 B2 | * | 6/2003 | Bossecker et al. ......... | 280/730.1 |
| 7,080,880 B2 | * | 7/2006 | Acker et al. ............ | 297/216.13 |
| 2001/0009327 A1 | * | 7/2001 | Zeigler ..................... | 280/735 |

FOREIGN PATENT DOCUMENTS

| | | | |
|---|---|---|---|
| DE | 42 09 605 A1 | | 10/1992 |
| DE | 43 23 543 C1 | | 10/1994 |
| DE | 44 15 467 C1 | | 11/1995 |
| DE | 296 10 078 U1 | | 11/1996 |
| JP | 10-71915 A | * | 3/1998 |
| JP | 11342822 A | * | 12/1999 |
| JP | 2004-9798 A | * | 1/2004 |

* cited by examiner

*Primary Examiner*—Ruth Ilan
(74) *Attorney, Agent, or Firm*—Foley & Lardner LLP

(57) ABSTRACT

A vehicle seat arrangement having a motor vehicle seat, in which arrangement it is possible to control the kinematics of the motor vehicle seat and/or of a vehicle occupant situated thereon, in such a way that, in the event of a crash, there is as small a relative movement as possible between the vehicle occupant and the motor vehicle seat along the direction of the crash forces.

5 Claims, 5 Drawing Sheets

SAFETY ARRANGEMENT FOR MOTOR VEHICLES

BACKGROUND

The invention relates to a safety arrangement for motor vehicles, which safety arrangement, in a crash, in particular a crash from the side, is intended to avoid the situation where an additional load is placed on a vehicle occupant because of an interaction between a motor vehicle seat and the occupant situated on the seat. In addition, the present invention may relate to motor vehicle seats with rigid and/or pronounced side bolsters.

As shown in FIG. 5, in a conventional arrangement, when a vehicle is subject to a crash from the side, the occupant may move relative to the seat resulting in damaging loading on the occupant. In known safety arrangements, the measures which are intended to limit the load placed on the occupant by interaction with the motor vehicle seat in the event of a crash lead to a reduction in the lateral support force during driving operation and/or to a general limitation of the potential to protect the occupant.

The invention is therefore based on the problem of further improving a safety arrangement of the abovementioned type.

BRIEF DESCRIPTION OF THE DRAWINGS

The features, aspects, and advantages of the present invention will become apparent from the following description, appended claims, and the accompanying exemplary embodiments shown in the drawings, which are briefly described below.

DESCRIPTION

An embodiment according to the invention has the effect that, in the event of a crash, in particular in a crash from the side, the damaging occupant interaction between the motor vehicle seat and the occupant situated thereon is reduced or prevented entirely. Here, the measures according to the invention have an effect only when the respective crash event occurs, and therefore have no negative influence on continuous driving operation.

According to one solution principle, the kinematics of the occupant and/or the seat are controlled in the event of a crash in such a way that it is not possible for a relative movement to occur between the motor vehicle seat and the occupant situated thereon along the direction of the respectively acting crash forces, in particular along the horizontal vehicle transverse axis (y-axis) in a crash from the side.

According to one aspect of this embodiment of the present invention, the occupant is held firmly in the associated motor vehicle seat when the crash forces occur, in particular by clamping which can be achieved, for example, by increasing the basic forces of a safety belt. For example, in the event of a side crash a vehicle safety belt may be automatically be tightened using a motorized seat belt retractor (MSB) other seat belt tightening method such as, for example, a pretensioner.

According to another variant of the abovementioned embodiment of the present invention, a motor vehicle seat is configured or mounted so as to be movable, in such a way that it can move, jointly with the vehicle occupant, toward the vehicle structure on which the external crash forces act, in particular in the direction of the side structure of a motor vehicle in the event of a crash from the side. This can be achieved by movable or bendable seat connecting elements. Such as for example, the connection mechanism between the vehicle and the seat may allow for some movement of the portion of the vehicle seat that contacts the occupant. For example bendable or flexible seat rails may be use.

According to another embodiment of the present invention, the kinematics of the occupant and the seat are controlled in a crash from the side in such a way that, in the event of a relative movement of the occupant with regard to the associated motor vehicle seat along or counter to the direction of the acting crash forces, in particular along the horizontal vehicle transverse axis (y-axis) in the event of a crash from the side, the kinematics of the seat and/or the occupant proceed such that a damaging interaction between the occupant and the associated seat is reduced or prevented as far as possible, and the kinematics on which this is based are optimized.

Figure 1:
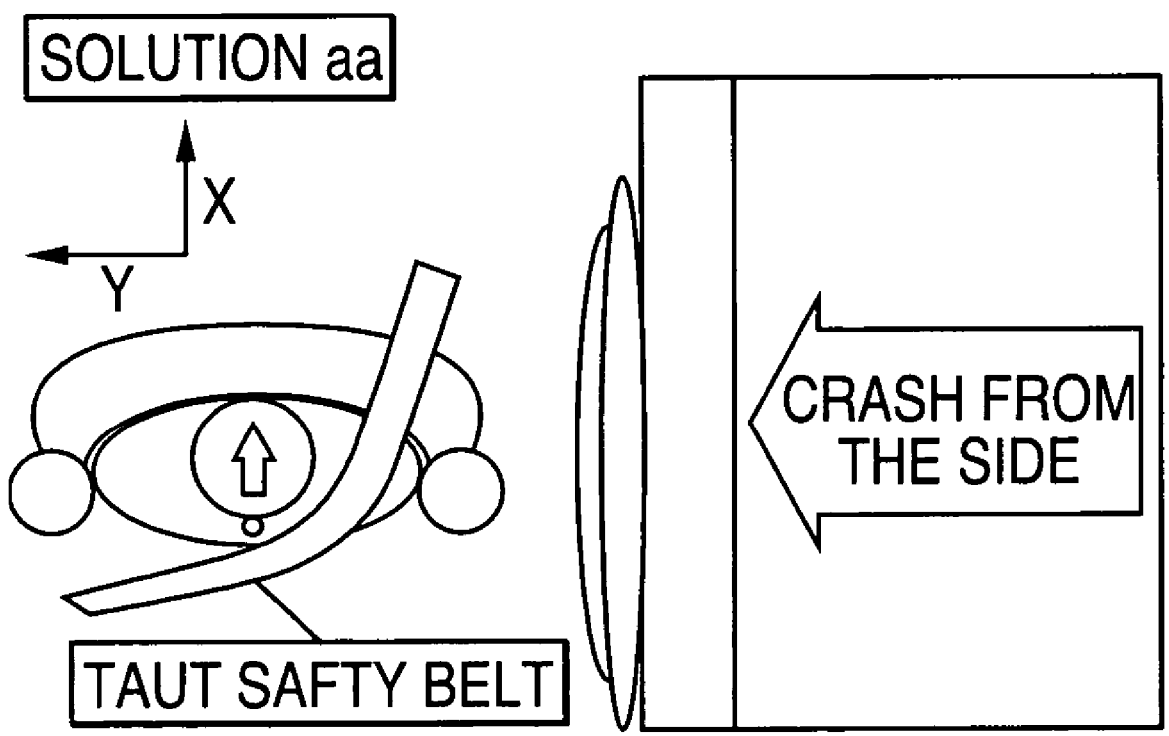
FIG. 1 shows an exemplary embodiment of a first variant of the first exemplary embodiment of the present invention in which, in the event of a crash from the side, the kinematics of the occupant and the seat are controlled in such a way that no relative movement takes place between the two in the y-direction.
Figure 2:
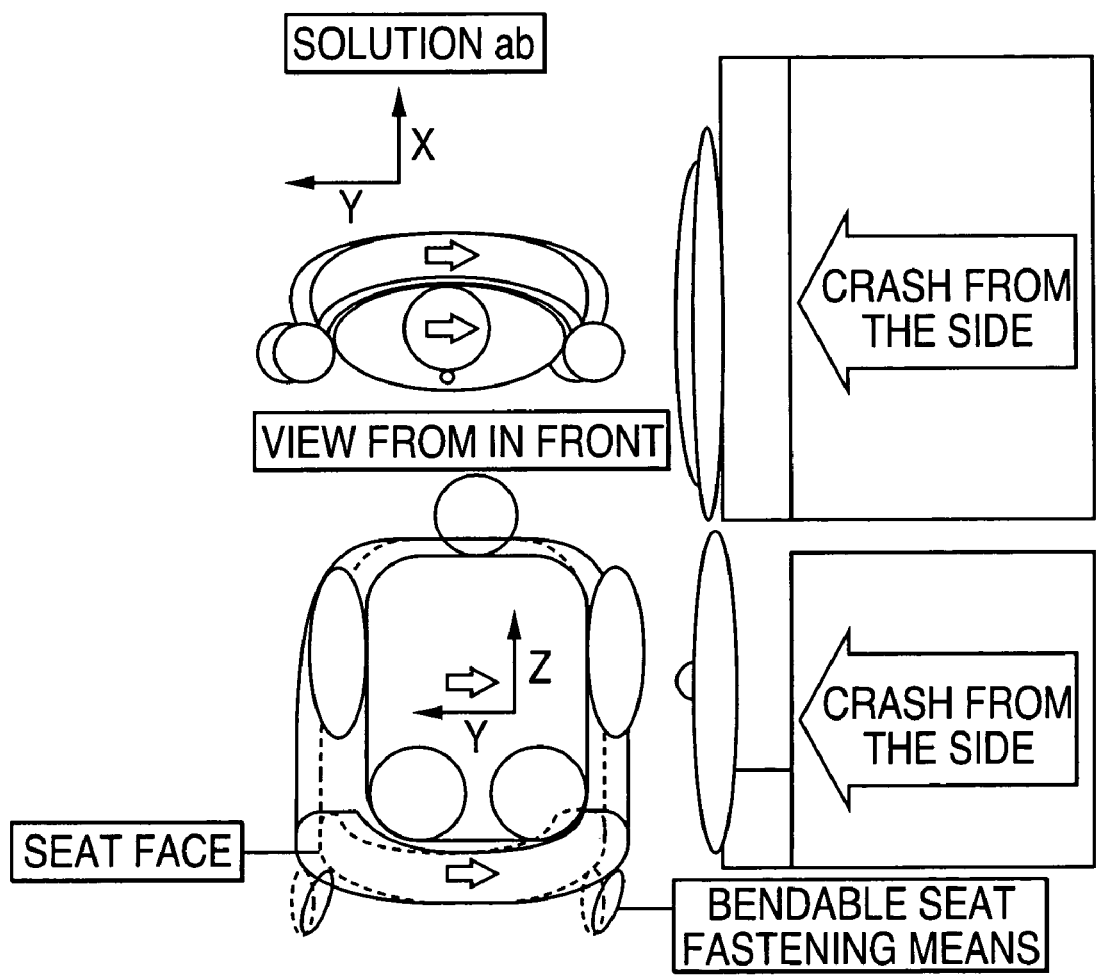
FIG. 2 shows an exemplary embodiment of a second variant of the first exemplary embodiment of the present invention.
Figure 3:
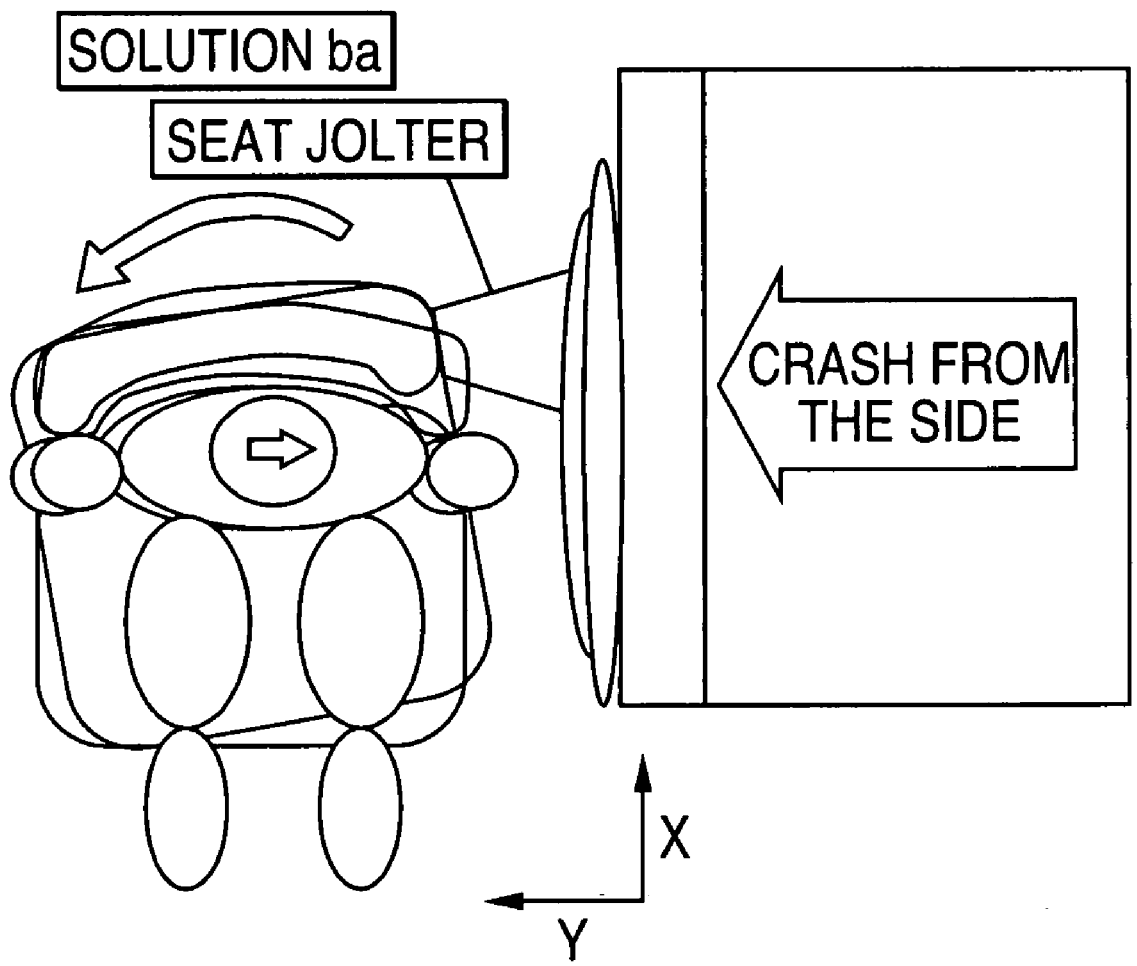
FIG. 3 shows an exemplary embodiment of a first variant of the second exemplary embodiment of the present invention in which in the event of a crash from the side, the kinematics of the occupant and the seat are controlled in such a way that, in the event of a relative movement in the y-direction between the seat and the occupant, the seat and occupant kinematics are controlled in such a way that the damaging interaction or kinematics is/are reduced or prevented.

According to one variant of this embodiment of the present invention, the seat is jolted in the event of a crash, with the result that those elements of the seat which are dangerous with regard to the interaction which is to be avoided move away along a direction which has a horizontal direction component which extends perpendicularly with respect to the direction of the crash forces. As a rule, this leads to the seat being jolted, which rotates the seat out of the interaction region. In the event of a crash from the side, in which the crash forces act along the horizontal vehicle transverse axis (y-axis), the movement direction of the seat has a direction component along the horizontal vehicle longitudinal axis (x-axis). As shown in FIG. 3, the jolting of the seat may be accomplished be a seat jolter projecting from the side of the vehicle.

Figure 4:
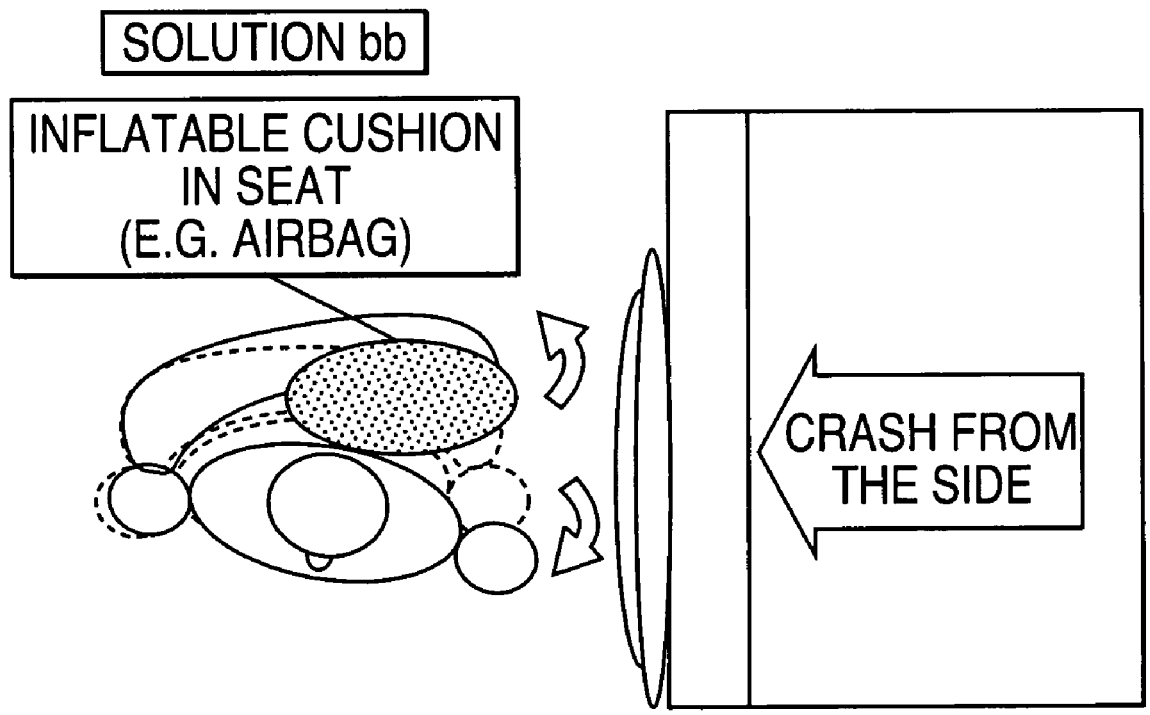
FIG. 4 shows an exemplary embodiment of a second variant of the second exemplary embodiment of the present invention.
Figure 5:
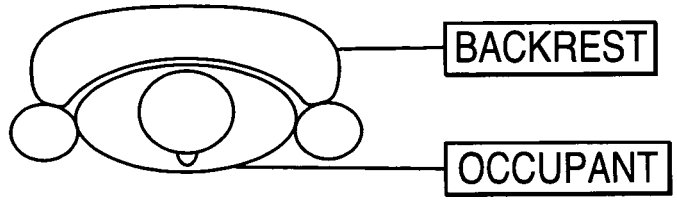
FIG. 5 shows a summarizing illustration of the problem on which the present invention is based.
Figure 5:
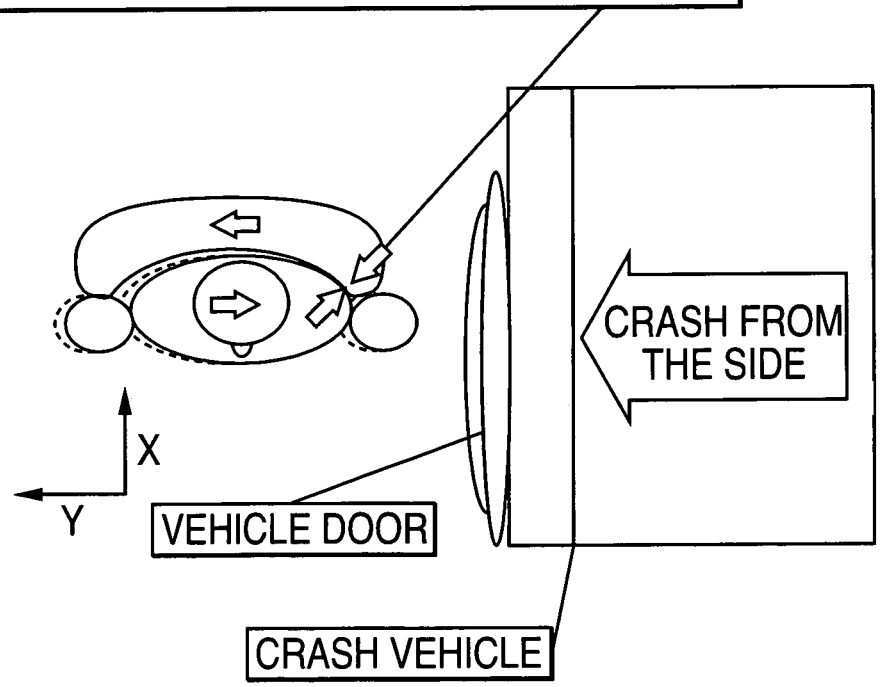

According to another variant of the abovementioned embodiment of the present invention, an actuator is arranged between the motor vehicle seat and an occupant situated thereon, which actuator, in the event of a crash, causes the seat element or seat elements which is/are dangerous with regard to interaction with the occupant, and the occupant to be removed from one another in such a way that a damaging interaction is prevented. As shown in FIG. 4, an airbag, for example, can serve for this purpose, which airbag is arranged in the backrest or a side part of the seat and is inflated in the event of a crash, said airbag pressing the occupant situated on the motor vehicle seat in a defined, predeterminable direction away from the seat region which is at risk of impacts.

The invention has the effect that, in the case of a crash from the side, the damaging occupant interaction between the seat and the occupant is reduced or prevented. This can be brought about by the following exemplary features of the present invention:

a) In the event of a crash from the side, the kinematics of the occupant and the seat are controlled in such a way that no relative movement takes place between the two in the y-direction.
   aa) Holding occupants in the seat by clamping (for example, increasing the belt forces);
   ab) Configuring the seat to be so movable that it can move with the occupant toward the side structure (for example, by seat connecting elements which bend away).
b) In the event of a crash from the side, the kinematics of the occupant and the seat are controlled in such a way that, in the event of a relative movement in the y-direction between the seat and the occupant, the seat and occupant kinematics are controlled in such a way that the damaging interaction or kinematics is/are reduced or prevented.
   ba) The seat is jolted in the event of a crash from the side, in order that the elements of the seat which are dangerous in an interaction move away from the occupant in a movement direction which has at least one direction component in the x-direction (jolting of the seat, which rotates the seat out of the interaction region);
   bb) Actuator between a seat and an occupant, which causes the seat element and the occupant to be removed from one another in such a way that a damaging interaction is prevented (for example, airbag in the seat backrest which presses the seat and the occupant away from one another).

The present invention, described above using different exemplary embodiments, makes it possible to improve occupant safety and can be used everywhere where a vehicle occupant situated on a motor vehicle seat can interact in a damaging manner with the motor vehicle seat in the event of a crash.

What is claimed is:

1. A safety arrangement for motor vehicles, comprising:
a seat for holding a vehicle occupant, wherein the arrangement is configured to control kinematics of the motor vehicle seat and/or of a vehicle occupant situated thereon, in the event of a crash having crash forces in the horizontal vehicular transverse axis direction tending to cause a relative movement between the motor vehicle seat and the vehicle occupant situated thereon in the direction of the crash forces, such that a damaging interaction between the vehicle occupant and the motor vehicle seat is reduced; and
an airbag configured to deploy into a position that separates the occupant from the seat back so that damaging interaction between the vehicle occupant and the seat is thereby reduced, and wherein the airbag is configured to move the occupant in a horizontal vehicle longitudinal axis direction away from the seat back.

2. The arrangement of claim 1, wherein the airbag is stored in the seat back and deploys forwardly to separate the occupant from the seat back.

3. A safety arrangement for motor vehicles, comprising:
a seat for holding a vehicle occupant, wherein the arrangement is configured to control kinematics of the motor vehicle seat and/or of a vehicle occupant situated thereon, in the event of a crash having crash forces in the horizontal vehicular transverse axis direction causing a relative movement between the motor vehicle seat and the vehicle occupant situated thereon in the direction of the crash forces, such that a damaging interaction between the vehicle occupant and the motor vehicle seat is reduced,
wherein the arrangement includes an actuator to separate the vehicle occupant and vehicle seat only at vehicle seat area at risk of impact from crash forces, and the actuator is an airbag configured to deploy into a position that separates the occupant from the seat back so that damaging interaction between the vehicle occupant and the seat is thereby reduced, and wherein the airbag is configured to move the occupant in a horizontal vehicle longitudinal axis direction away from the seat back.

4. The arrangement of claim 3, wherein the airbag is located in a backrest or side part of the vehicle seat.

5. The arrangement of claim 4, wherein the airbag is positioned to inflate only on one side behind the vehicle occupant to tilt the occupant away from the area of vehicle seat at risk of impact from crash forces.

* * * * *